United States Patent Office 2,941,441
Patented June 21, 1960

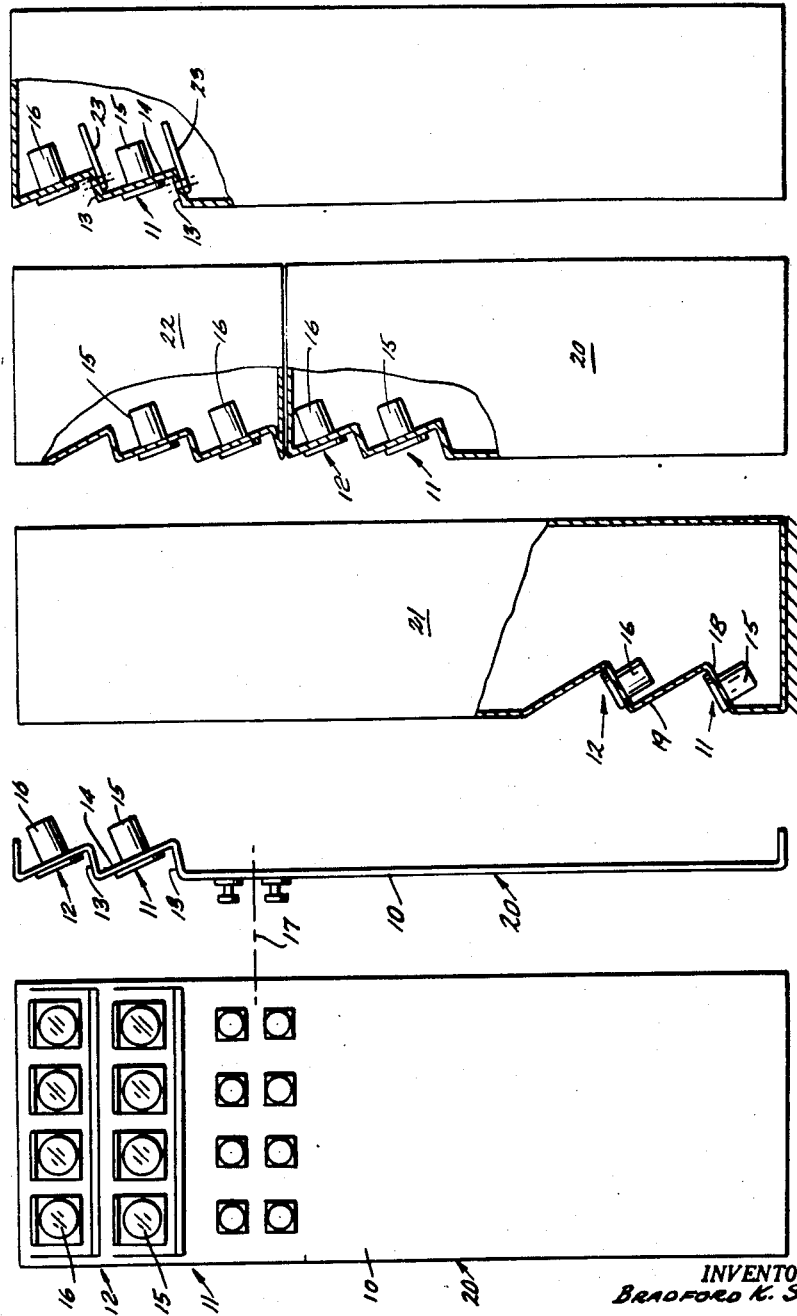
June 21, 1960     B. K. STURGIS     2,941,441
ANTI-GLARE INSTRUMENT PANEL
Filed July 9, 1954
INVENTOR.
BRADFORD K. STURGIS
BY
ATTORNEYS

2,941,441

ANTI-GLARE INSTRUMENT PANEL

Bradford K. Sturgis, North Hills, Pa., assignor to I-T-E Circuit Breaker Company, Philadelphia, Pa., a corporation of Pennsylvania Filed July 9, 1954, Ser. No. 442,373

2 Claims. (Cl. 88—1)

My present invention relates to a novel housing for electric devices including standard instruments for indicating the condition or operation thereof, and is more particularly directed to the means for mounting the instruments in the housing, in such manner that they may be vertically as well as horizontally aligned with respect to each other, while at the same time may be mounted at such an angle as to be read from below without glare.

When standard instruments are mounted on a vertical panel surface above the eye level of the viewer, reflection from the face of the instruments due to overhead lighting makes it difficult for the viewer to read the instruments. In the prior art this problem has been solved by providing special instruments which have either a fixed sloped glass viewing window or an adjustable window which can be tilted or sloped when the instrument is mounted on a vertical plane above eye level.

With the arrangement of my invention I mount standard instruments at an angle to eliminate glare and hence, eliminate the necessity of having instruments with sloped or adjustable mounted viewing windows.

Heretofore, in the manufacture of housings for electrical equipment owing to the heat necessarily generated within the housing by the various electrical structures therein contained it has been necessary always to arrange the instruments at the front of the housing in such a position that they are in the path of convection currents or radiation which will unduly raise their temperatures. This is particularly important not only in the case of relatively static electrical arrangements such as busses and transformers, but is of real importance where electrical equipment such as circuit breakers are so housed, which on the opening thereof generate an arc with a tremendous amount of heat.

This has limited the mounting of the instruments to the front of the housing so that it has heretofore been impossible to slope or recess the housing to provide greater viewability for the instruments. It is well known that when an instrument panel is to be viewed above sight level that the whole instrument panel may be sloped. The sloping of the instrument panel, however, brings the instrument over a portion of the apparatus in the housing, thereby placing the instruments in the path of convected or radiated heat currents.

If the instruments are located above sight level it has heretofore been necessary to mount the panel outside the housing or as a projecting element from the housing itself, thereby increasing the volume of the housing or narrowing the upper levels of an aisle adjacent the housing.

Instruments have also been furnished with the faces thereof of prismatic form in order to make the instruments more readily readable from below, adding substantially, however, to the cost of the instrument.

My invention is directed to the arrangement of the upper section of the front panel of a housing for electrical devices so that a series of horizontal mounting elements are provided for standard instruments which will support the instrument at the front of the housing without extending the front of the housing beyond the housing proper and without sloping the housing in such manner as to bring the instruments into a position to be affected by heat current within the housing.

More particularly my invention is directed to the utilization of a plurality of angular recesses at the front panel of the housing, the said angular recesses extending substantially horizontal, but substantially triangular in cross section, the lower portion of the recess being sloped upwardly and inwardly and the upper portion of the recess, being normal to the lower portion and extending toward the front of a panel. By this means the upper portion of each recess is tilted toward the line of sight.

Hence, standard instruments, without special viewing faces, may then be mounted in the panels formed by the upper portion of each recess and be clearly in view from below. Thus, a plurality of instruments may be mounted one above the other without substantially diminishing or increasing the size of the housing or the aisle space between housings.

This is of particular importance in most installations where illumination comes from above. The operator viewing the instrument from below will ordinarily see, in a typical instrument arrangement with vertical faces, a reflection of the overhead illumination and the glass cover of the instrument dial, making it necessary for the operator to shift his position from time to time in an attempt to view the instrument carefully, and quite often making it necessary for the operator to hold up a paper or other means above the face of the instrument, providing he can reach it, in order to make the instrument viewable.

By arranging the instruments in tiered form without substantially increasing or diminishing the size of the housing and placing the instruments on the series of inclined panels as above pointed out the axis of the instrument may be made substantially normal to the line of sight while its face may then be arranged parallel to the line of illumination. Thus, the source of room illumination will not be reflected to the operator's eyes at the time he is viewing the instrument panel and all reflections will thereby be obliterated. At the same time, since the operator has been able to view the instrument panel along a line which passes substantially through the axis of the instrument, he will see the instrument surface in full face or in a flat line and errors in reading, which may arise from viewing the instrument face at a substantially angular view will be avoided.

Accordingly, the primary object of my invention is the provision of a novel housing with a plurality of separate sloped tiered recesses vertically aligned with each other, the sloped surfaces of the recesses providing a means for mounting instruments alongside each other and above each other in banking formation, the faces of the instruments being downwardly directed along the line of sight with glare and reflection eliminated, the said arrangement neither substantially increasing nor decreasing the interior volume of the housing.

These and other objects of my invention will be apparent from the following description when taken in connection with the drawings in which:

Figure 1 is a front schematic view of a vertical instrument panel showing the instruments mounted above eye level.

Figure 2 is a partial side view of the vertical instrument panel of Figure 1.

Figure 3 is a partial side view of a vertical instrument panel showing the instruments mounted in tiered recesses below eye level.

Figure 4 is a partial side view illustrating the manner in which the two housings, each having tiered recesses, of my invention can be combined.

Figure 5 is a partial side view illustrating a modification of my invention.

Referring to Figures 1 and 2 the vertical instrument panel 10, which may be the front side of a housing contains a plurality of triangularly recessed portions 11 and 12 which extend substantially horizontally. Each recess has a lower portion 13 which is sloped upwardly and into the housing 20. The upper portion 14 is substantially perpendicular to the lower portion and extends downwardly into the housing 20.

The upper portion 14 is preferably perpendicular to the line of sight. The plurality of standard instruments, such as 15 and 16 are mounted on the portion 14 so that their viewing face 11 is also perpendicular to the line of sight. Thus, the standard instruments such as 15 and 16, which have their viewing windows 11 mounted parallel to the dials of the instrument, are nevertheless free from glare since it is substantially perpendicular to the line of the viewer which will be somewhere along the line 17.

In Figure 3 I have shown how my novel tiered triangular recess can be utilized for instruments which are mounted below the line of sight 17. In this case the instruments 15 and 16 are mounted on the lower portion 18, which is substantially perpendicular to the line of sight 17. The upper portion 19 is substantially perpendicular to the lower portion 19 to facilitate viewability from above and permit additional rows of instruments to be mounted on triangular tiers thereabove.

In Figure 4 I have illustrated the manner in which two housings 20 and 21 can be mounted in vertical alignment and still utilize my novel arrangement. The upper housing 21 has the plurality of rows of triangular recesses 11 and 12 at the bottom thereof, whereas the lower housing 20 has the rows 11 and 12 at the upper portion thereof.

In Figure 5 I have illustrated an embodiment wherein the instruments such as 15 and 16 can be protected from heat radiation which may exist within the housing such as 20. For example, if the housing contains a circuit breaker there may be extreme heat generated therein with the protective device open. Hence, I provide baffles 23 which may be secured to the lower portions 13 in order to deflect the heat away from the instruments, such as 15, and 16.

Hence, I have provided a novel anti-glare arrangement for standard instruments which does not require an enlargement of the housing volume, nor does it require substantial space within the housing.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. Anti-glare arrangement for electrical instrument to facilitate observation thereof in a preferred position in the presence of a source of ambient illumination comprising, a housing having a front panel disposed in a vertical plane, mounting means for a plurality of visual indicator instruments on said front panel; said mounting means comprising a plurality of horizontally extending recesses in said front panel; said recesses being parallel to one another and being arranged one above the other; each of said recesses comprising a first section extending inwardly into said housing at an angle to the principal plane of said front panel and a second section extending from the said inward portion of said first section and back to said panel; said first section being adapted to support a plurality of instruments with the faces of said instruments parallel to the plane of said first section; each of said instruments including a lens over its instrument face and in a plane parallel thereto and parallel to the plane of said first section; said preferred position of observation being in front of said front panel and along a plane extending perpendicular from said lenses of said instrument; and said source of illumination being in front of said front panel; such that a line drawn from said source of illumination to said lenses of said instruments forms at least a relatively small angle with respect to said plane extending perpendicularly from said lenses of said instruments.

2. The device as set forth in claim 1 wherein said second section of each of said recesses has a plurality of baffles; each of said baffles being positioned interior of the housing and perpendicular to the plane of said first section and being adapted to direct heat away from said instruments.

References Cited in the file of this patent

UNITED STATES PATENTS

| 262,312 | Rearden | Aug. 8, 1882 |
| 1,823,707 | St. Clair | Sept. 15, 1931 |
| 1,836,881 | Sperry | Dec. 15, 1931 |
| 2,160,270 | Kenney | May 30, 1939 |
| 2,285,658 | Hitchock | June 9, 1942 |

FOREIGN PATENTS

| 834,000 | France | of 1938 |
| 822,412 | Germany | Nov. 26, 1951 |
| 910,600 | Germany | May 3, 1954 |

OTHER REFERENCES

Abstract, Blacnha, vol. 627, page 876, O.G., Oct. 18, 1949.